United States Patent
Gridley et al.

(10) Patent No.: US 10,220,581 B2
(45) Date of Patent: Mar. 5, 2019

(54) MOLDED ARTICLE EXTRACTOR AND METHOD

(71) Applicant: Bridgestone Bandag, LLC, Muscatine, IA (US)

(72) Inventors: Jason Len Gridley, Wilton, IA (US); Troy Allen Kost, LeClair, IA (US)

(73) Assignee: Bridgestone Bandag, LLC, Muscatine, IA (US)

( * ) Notice: Subject to any disclaimer, the term of this patent is extended or adjusted under 35 U.S.C. 154(b) by 1282 days.

(21) Appl. No.: 14/321,186

(22) Filed: Jul. 1, 2014

(65) Prior Publication Data

US 2014/0312533 A1 Oct. 23, 2014

Related U.S. Application Data

(62) Division of application No. 13/281,587, filed on Oct. 26, 2011, now Pat. No. 8,807,984.

(51) Int. Cl.
| | |
|---|---|
| *B29C 37/00* | (2006.01) |
| *B29D 30/00* | (2006.01) |
| *B29D 30/06* | (2006.01) |
| *B29D 30/52* | (2006.01) |

(52) U.S. Cl.
CPC ...... *B29D 30/0016* (2013.01); *B29C 37/0007* (2013.01); *B29D 30/0681* (2013.01); *B29D 30/52* (2013.01); *B29D 2030/0033* (2013.01)

(58) Field of Classification Search
CPC ............ B29D 30/0016; B29D 30/0681; B29D 30/52; B29D 30/60; B29C 37/0007
See application file for complete search history.

(56) References Cited

U.S. PATENT DOCUMENTS

| | | | |
|---|---|---|---|
| 5,967,512 | A | 10/1999 | Irsik |
| 6,177,042 | B1 | 1/2001 | Fike |
| 6,685,867 | B2 | 2/2004 | Wellman et al. |
| 7,316,252 | B1 | 1/2008 | Heard |
| 7,468,153 | B2 | 12/2008 | Weydert et al. |
| 7,481,638 | B1 | 1/2009 | Burg |
| 7,946,581 | B2 | 5/2011 | Tratar et al. |

(Continued)

FOREIGN PATENT DOCUMENTS

| | | |
|---|---|---|
| CN | 1556743 A | 12/2004 |
| CN | 1803447 A | 7/2006 |

(Continued)

OTHER PUBLICATIONS

The First Office Action issued in Chinese Patent Application No. 201280058138.6, dated Sep. 2, 2015.

(Continued)

*Primary Examiner* — Joseph S Del Sole
*Assistant Examiner* — John Robitaille

(57) ABSTRACT

A tire tread extractor used in the manufacture of treads includes a frame, a first nip roller rotatably associated with the frame, and a second nip roller rotatably associated with the frame. The first and second nip rollers are adapted to engage a tire tread at least partially resident in a mold. A driving mechanism associated with the first and/or second nip rollers operates to impart rotational motion thereto. The frame is configured for longitudinal movement along a substantial portion of a longitudinal length of the mold while maintaining the first and second nip rollers in a spaced relation to the mold.

21 Claims, 8 Drawing Sheets

(56) References Cited

U.S. PATENT DOCUMENTS

| | | |
|---|---|---|
| 2005/0211351 A1 | 9/2005 | Majumdar et al. |
| 2011/0041984 A1 | 2/2011 | Steinke et al. |
| 2011/0101568 A1 | 5/2011 | Gallego et al. |
| 2011/0192925 A1 | 8/2011 | Pagaza-Melero |
| 2012/0146262 A1 | 6/2012 | Adams et al. |

FOREIGN PATENT DOCUMENTS

| | | |
|---|---|---|
| WO | WO-03/013819 | 2/2003 |
| WO | WO-2008/057077 | 5/2008 |
| WO | WO-2011/025499 | 3/2011 |

OTHER PUBLICATIONS

The European Search Report issued in European Patent Application No. 12843932.0, dated May 15, 2015.
Australian Examination Report No. 1 issued in AU2012329301, dated Jul. 22, 2016.
Hong, Sung Ran; International Search Report and Written Opinion; dated Feb. 28, 2013; pp. 1-9; Korean Intellectual Property Office; Daejeon, Republic of Korea.

MOLDED ARTICLE EXTRACTOR AND METHOD

CROSS-REFERENCE TO RELATED APPLICATION

This patent application is a divisional of copending U.S. patent application Ser. No. 13/281,587, filed Oct. 26, 2011, which is incorporated herein in its entirety by this reference.

FIELD OF THE DISCLOSURE

This disclosure relates to a device and method for removing molded articles from their molds and, more particularly, to the removal of a vulcanized rubber molded article such as a tire tread from a mold of a curing press.

BACKGROUND OF THE DISCLOSURE

Molded articles may be formed when a preform of an article is placed in a mold for shaping. Removal of the article from the mold after a forming operation is complete without causing damage to the molded article is often carried out as a separate operation during the manufacturing process. Depending on the shape, placement and orientation of various physical features of the molded article, the removal of the article form the mold may require special care to avoid tearing, breakage, or other damage.

In the field of tire manufacturing, a common molding operation includes vulcanizing a rubber composite material in a curing press. Curing presses include molds that enclose a rubber composite preform to provide pressure and heat cures the preform into a useable article, for example, a strip or belt of tire tread. Such tire treads are typically used in tire retreading and other applications.

A typical curing press mold includes a mold plate that forms a cavity. One side of the cavity forms various depressions and ridges that correspond to the desired tread pattern of the tire tread that will emerge therefrom. A plate or platen is placed over the mold cavity after a tread preform has been loaded into the cavity. Pressure and heat are provided by the press to force the preform to assume the shape of the mold cavity and to cure the preform into vulcanized rubber.

In certain tread patterns such as those used for trucks or off-road applications, the tread lugs may have a substantial height relative to the overall thickness of the tread, the tread sipes may be closely spaced, the lugs may have negative draft angles, and other features that can create challenges when prying the finished tread from the mold. Given that rubber is an inherently elastic material, simply pulling one end of the finished tire tread to remove the tread from the mold may present various challenges, including stretching of the tread, tearing or cracking of the tread, and other effects.

DETAILED DESCRIPTION OF PREFERRED EMBODIMENTS

In one aspect, the disclosure describes a tire tread extractor used in the manufacture of treads. The tire tread extractor includes a frame, a first nip roller rotatably associated with the frame, and a second nip roller rotatably associated with the frame. The first and second nip rollers are adapted to engage a tire tread at least partially resident in a mold. A driving mechanism associated with the first and/or second nip rollers operates to impart rotational motion thereto. The frame is configured for longitudinal movement along a substantial portion of a longitudinal length of the mold while maintaining the first and second nip rollers in a spaced relation to the mold.

In another aspect, the disclosure describes a manufacturing assembly for manufacturing tire treads. The manufacturing assembly includes a molding press and a mold apparatus disposed within the molding press. The mold apparatus includes a mold having a molding cavity and a platen disposed to fit in relation to the molding cavity. The mold apparatus is configured to be capable of holding a tread preform within the molding cavity in the forming of a tire tread. The platen and the mold are separable to provide an opening therebetween. A tread extractor longitudinally traverses the mold in spaced relation and includes a frame and a pair of nip rollers rotatably associated with the frame. The pair of nip rollers is configured to be capable of engaging the tire tread while at least a portion of the tire tread remains in the molding cavity.

In yet another aspect, the disclosure describes a method for manufacturing a tread. The method includes providing a frame capable of moving along a longitudinal length of a mold, and further providing a pair of rotatable nip rollers relative to the frame. An end of the tread is freed from the mold and pinched between the nip rollers. Rotation of at least one of the nip rollers is driven such that the tread is freed from the mold while advancing the frame and nip rollers along the longitudinal length of the mold.

Figure 1:
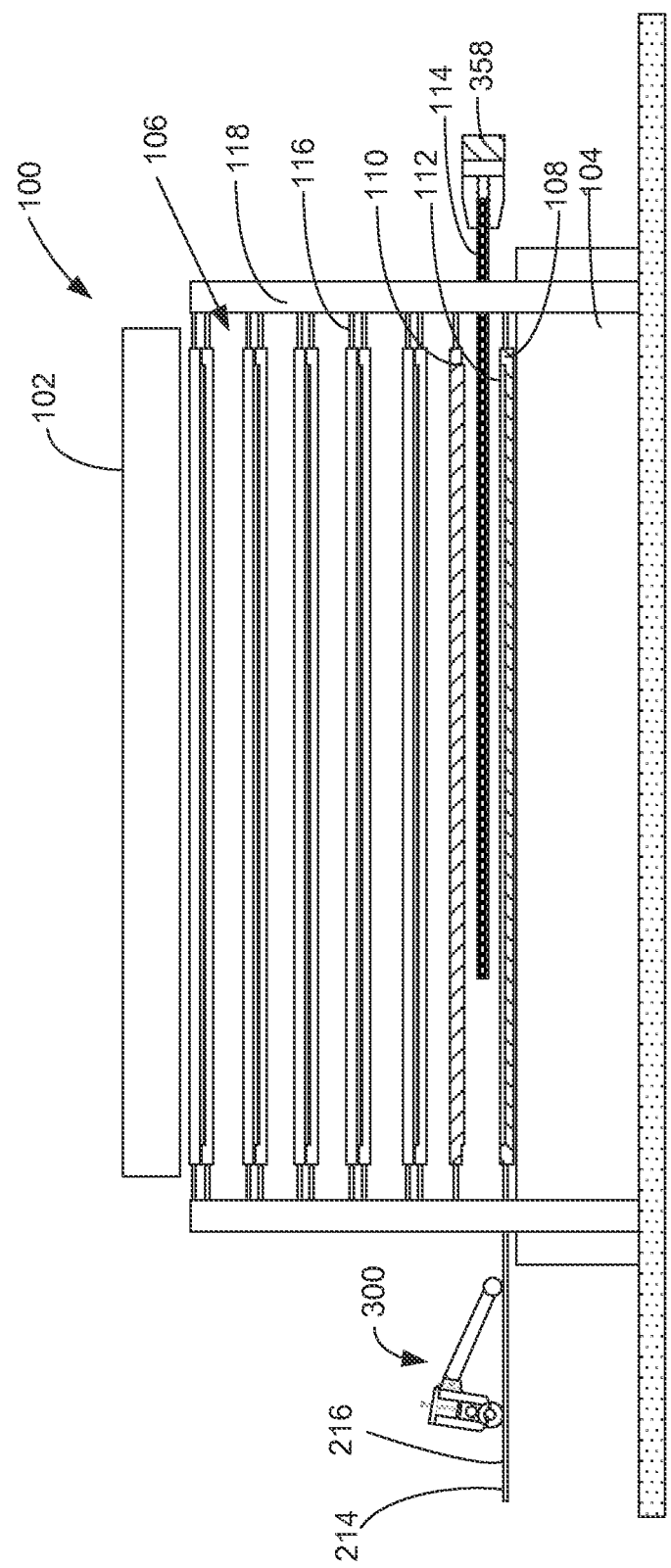
FIG. 1 is a partial view of a curing press in accordance with a preferred embodiment.

A curing press 100 from a side perspective is partially shown in FIG. 1. Although the curing press 100 may be part of a larger tread forming operation that includes, for example, a composite preform building apparatus, a forming press, and other structures (not pictured). The curing press 100 includes top and bottom press blocks 102 and 104. Between the press blocks 102 and 104 are a plurality of mold assemblies 106, each including two parts that come together to define an internal molding cavity. In the illustration of FIG. 1, a mold 108 and a platen 110 make up the mold assembly, but other configurations may be used. For example, what is referred to relative to FIG. 1 as a mold 108 may be positioned in an inverted orientation in the press 100 such that a mold cavity is facing down. In such embodiment, the platen 110 would be positioned below the mold 108 such that it fits over the mold cavity. In the description that follows, a particular orientation having the mold 108 located beneath the plated 110 is discussed for illustration, but it should be appreciated that the relative orientation of these two elements may be in other orientations. Moreover, although six mold assemblies 106 are shown, a single assembly or a different number of mold assemblies may be used. Each mold 108 forms a mold cavity 112 into which a preform is packed or loaded. Following the application of pressure and heat to the closed mold assembly 106, a vulcanized tread 114 can emerge. In other alternatives, the press may be configured to provide continuous manufacture of the molded article or a tread in belt or other form.

The curing press 100 further includes linkages 116 that connect the parts of each mold assembly 106 to frame members or posts 118, which include mechanisms (not shown) that can selectively move the various parts of each mold assembly 106 vertically to enable the loading of preforms and the unloading of finished treads from each mold assembly 106. Moreover, a robot arm 510 may be connected to a vertically extending member 119, which extends between the posts 118 along a rail 121. The robot arm 510 is configured to traverse the press 100 at least along the rail 121, which rail 121 extends along the length of the mold assemblies 106, and vertically along the member 119 relative to the curing or molding press 100. The robot arm may alternatively be associated with a grapple and a tread extractor device, as discussed in more detail herein relative to FIG. 8. In a forming process for a tread 114, a tread preform, which may be built by successively stacking layers of rubber with other materials such as thread, fabric, steel belts, wire mesh and the like, is loaded into a mold 108. Each mold 108 has ridges and depressions formed therein that will shape and mold the lugs and sipes of a desired pattern in the emerging tread 114. The platen 110 is placed in opposed relationship to the mold cavity 112 and a curing process ensues that vulcanizes the preform into the tread 114. The tread is thereafter detached and removed from the mold 108.

When forming the tread 114, the mold 108 imprints onto the preform a predetermined pattern of lugs and/or ribs. In reference to FIG. 2, these lugs are formed as depressions 202 in a bottom surface 204 of the mold 108, which are separated by sipe blades or ridges 203. The mold 108 forms an internal cavity 206 that is open from the top and surrounded by the bottom surface 204 and walls 210 that extend around the perimeter of the cavity 206. Although a mold configured to form a single tread strip is shown, the mold may include two or more additional cavities extending parallel to one another and configured to form two or more tread strips from a single preform. In the illustrated embodiment, the single-cavity mold 108 has a generally elongate rectangular shape that extends along an axis 212. The mold 108 further includes two tracks or ledges 214 extending along its sides, generally parallel to the axis 212. Each ledge 214 is disposed on one side of the mold 108 and includes a track 216 that extends generally parallel to a top edge 218 of the side portion of the wall 210 at an offset vertical distance 220 therefrom. Although the ledges 214 are shown to have a length that is about equal to the overall length of the mold 108 in FIG. 2, the ledges 214 can extend past the ends of the mold 108, as shown in FIG. 1.

Figure 3:
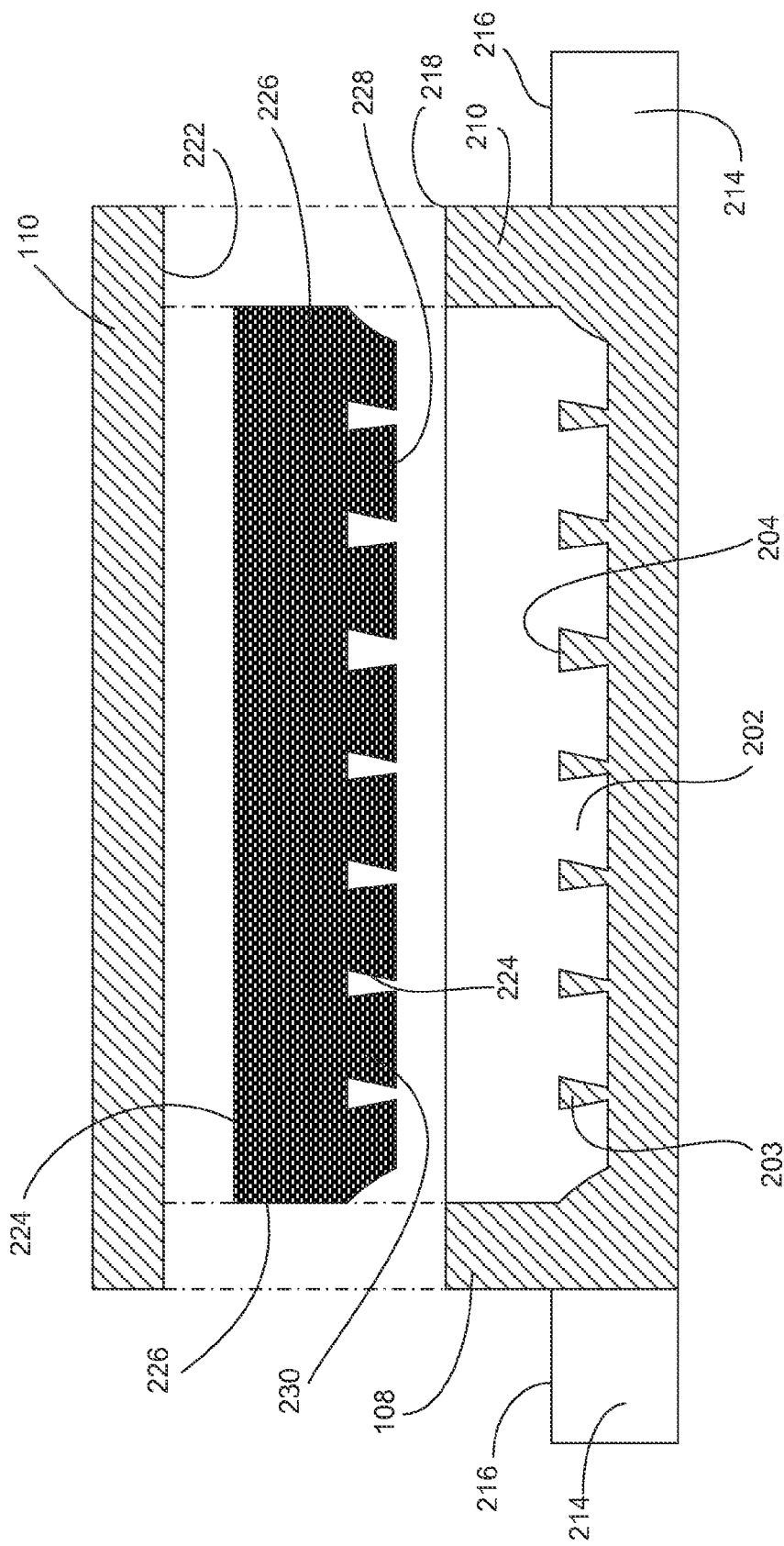
FIG. 3 is a cross section of a curing mold and a finished tread in accordance with a preferred embodiment.

A cross section of the mold assembly 106 during a molding operation phase is shown in FIG. 3. In this illustration, the mold assembly 106 is shown opened following a molding and curing operation for the tread 114. The top mold or platen 110 includes a bottom surface 222 that forms the top or inner surface 224 of the tread 114. The lateral surfaces 226 and the outer or tread surface 228 of the tread 114 are formed, respectively, by the side walls 210 and bottom surface 204 of the mold 108. Flash 227 may remain on the tread 114 along the interface between the platen 110 and the mold 108. A plurality of lugs 230 arranged along the tread surface 228 are formed by the corresponding lug depressions 202.

As may be seen in the cross section of FIG. 3, certain tread patterns may include small or even negative draft angles formed in the surfaces around the sides of the lugs 230. Draft angle denotes the resulting angle formed by mold surfaces relative to the direction of removal of the molded article from the mold. Accordingly, positive draft angles are disposed such that the removal of the molded article is facilitated, whereas negative draft angles are disposed such that at least some deformation of the molded article is required to remove it from the mold. In the cross section of FIG. 3, the lugs 230 have negative draft angles on their side surfaces 232, which have been exaggerated for the sake of illustration. As can be appreciated, certain portions of the lugs would have to elastically deform when removing the tread 114 from the mold 108. Depending on the amount of material subject to such deformation during removal of the tread 114 from the mold 108, the force required to remove the tread 114 from the mold may increase, as will the potential for damage to the tread 114 due to cracking or tearing as previously described.

Figure 4:
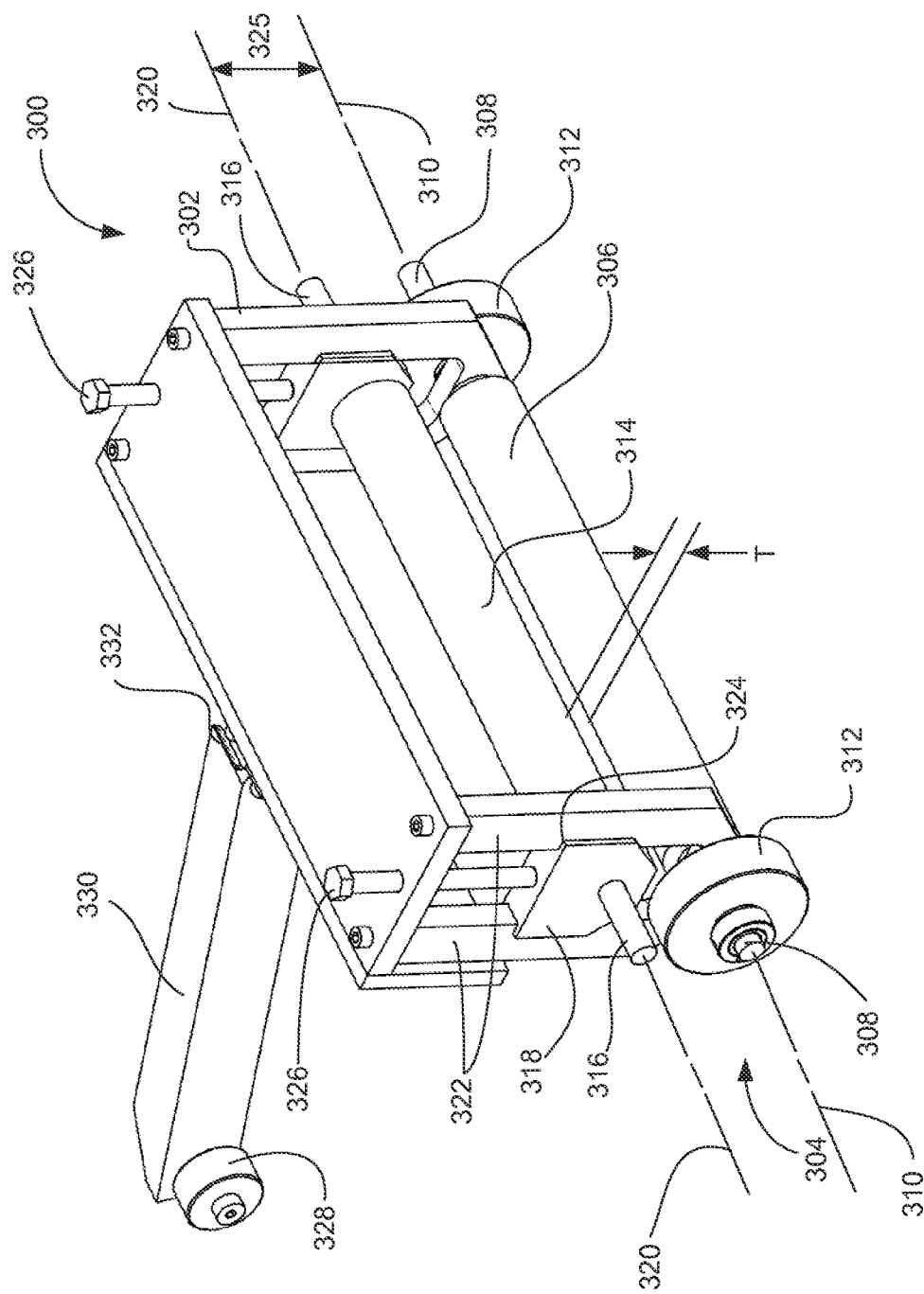
FIG. 4 is an outline view of a tread extractor in accordance with a preferred embodiment.

An outline of a nip roller tread extractor 300, which is suitable for removing treads from curing molds or presses and especially those treads having features that can increase the force required to remove the tread from the mold without causing damage to the tread, is shown in FIG. 4. In the illustrated embodiment, the extractor 300 includes a frame 302 that rotatably supports a set of nip rollers 304 that are adapted to be capable of engaging a molded article at least partially resident in a mold, for example, a tread. A first nip roller 306 is mounted to a first axle 308 that is supported by the frame 302 such that the first nip roller 306 can rotate relative thereto about a centerline 310 of the first axle 308. The rotation of the first nip roller 306 relative to the frame 302 about the centerline 310 may be accomplished at an interface between the first nip roller 306 and the first axle 308 and/or an interface between the first axle 308 and the frame 302. In the illustrated embodiment, the first nip roller 306 is rigidly connected to the first axle 308 such that rotation of both components can be provided at the interface between the first axle 308 and the frame 302. In this way, the driving force that can move the frame 302 relative to a mold during an extraction process may be accomplished by pulling the frame along the mold either by a pulling or tensile force applied to the molded article via the first nip roller and/or a driving force applied through the first axle 308 to wheels 312 that engage the mold.

The first axle 308 extends past either side of the frame 302 and includes a mold engagement mechanism (e.g., wheels 312) rotatably disposed on the free ends of the first axle 308. In the illustrated embodiments, both wheels 312 have the same diameter and are disposed to freely rotate relative to the first axle 308. Each wheel 312 is disposed on the first axle 308 such that the frame 302 and first nip roller 306 are located between the wheels 312, but other configurations may be used. In an alternative embodiment, for example, the wheels 312 may be omitted or the diameter of the first axle 308 may be increased at various segments thereof such as its ends to replace the wheels. In an alternative embodiment where the extractor 300 is powered along the mold, the wheels 312 of the mold engagement mechanism may be replaced by pinion gears (not pictured) that engage a rack gear formed along the longitudinal length of the mold to provide traction for a driving force that moves the frame relative to the mold. In such embodiments, the rack and pinion drive are mentioned as an illustrative but not limiting example of a driving mechanism, but other driving mechanisms may be used.

A second nip roller 314 is mounted to a second axle 316 that is slidably connected to the frame 302 via sliding blocks 318. Although a sliding arrangement is shown, the second nip roller 314 may be connected to an arm that is pivotally connected to the frame 302 such that rotation of the arm relative to the frame can adjust or change the distance between the first and second rollers 306 and 314. Moreover, a spring or other resilient element may operate to impart a force tending to push the two rollers together such that a pinching force applied to the tread between the rollers may be augmented. In the illustrated embodiment, the second nip roller 314 is configured to rotate relative to the frame 302 about a centerline 320 of the second axle 316, and translate in a direction towards or away from the first nip roller 306 by motion of the sliding blocks 318 relative to the frame 302. More particularly, a distance, T, between the first and second rollers 306 and 314 can be adjusted when the sliding blocks 318 are moved relative to the frame 302. Such motion, in the illustrated embodiment, is accomplished by providing a pair of parallel frame rails 322 that slidingly engage therebetween recesses 324 formed in the sides of each sliding block 318. An adjustment screw 326 or other mechanism can move the sliding blocks 318 and thus the second nip roller 314 relative to the frame 302 such that the distance T can be adjusted to sufficiently pinch objects between the second and first nip rollers 314 and 306 having variable thicknesses. It should be appreciated that although one configuration that allows for pinching of objects of various thickness is illustrated herein, other configurations can be used to equivalently selectively vary the distance between the nip rollers 306 and 314. The second nip roller 314 may also be rotatably driven as an alternative or compliment to the other driving mechanisms as described herein.

Figure 2:
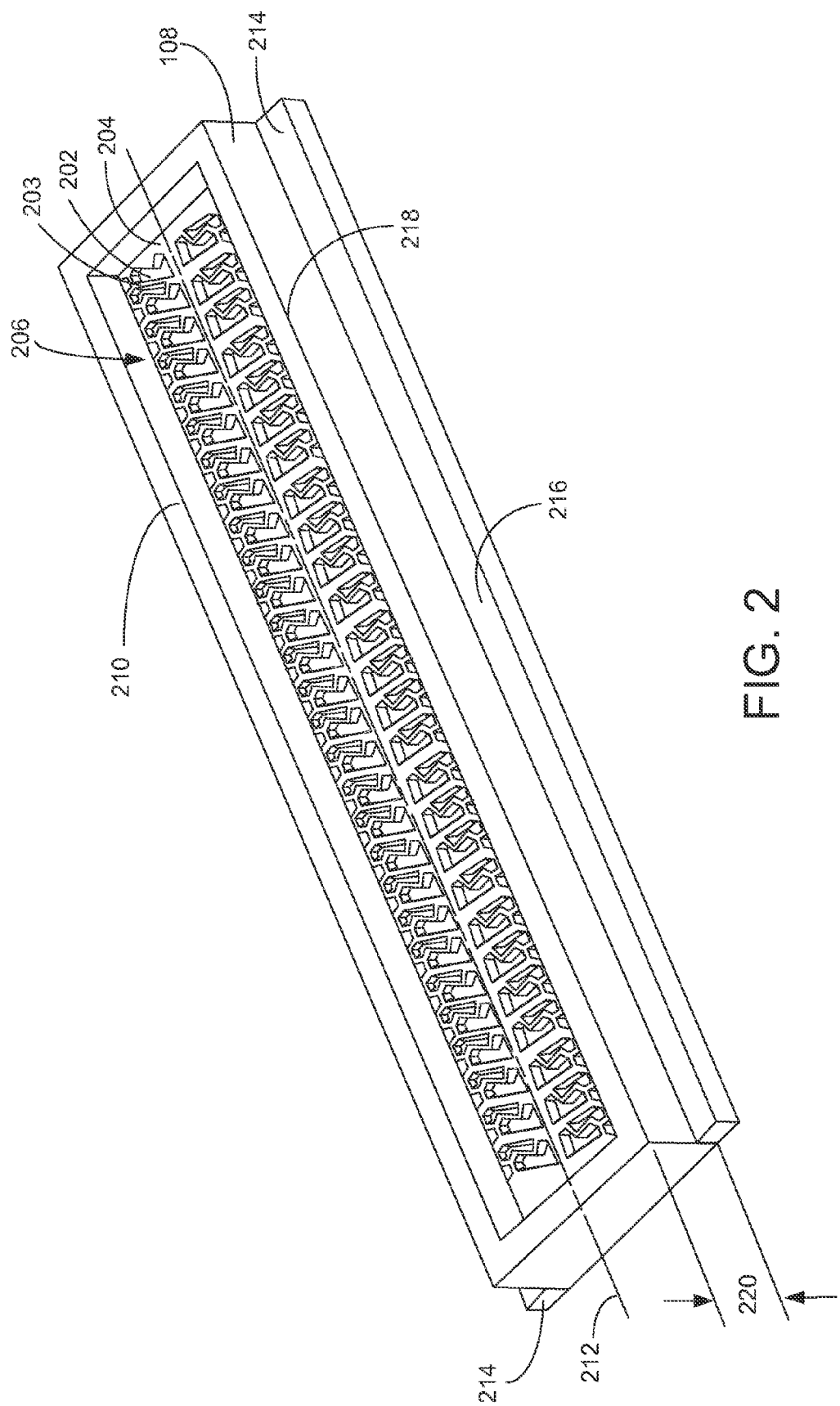
FIG. 2 is an outline view of a curing mold in accordance with a preferred embodiment.

The extractor 300 also includes an optional third wheel 328 that is rotatably mounted onto the end of a leading bar 330 that is pivotally connected at its other end 332 to the frame 302. The third wheel 328, along with the wheels 312 connected to the first axle 308 as previously described, provides a stable stance and orientation of the extractor 300 relative to the rolling surfaces of the wheels 312 and 328, as is shown more particularly to the section views of FIGS. 5 and 6. Moreover, the optional third wheel 328 may be steerable or otherwise adjustable to ensure that the extractor 300 travels along a path that is parallel to the axis 212 of the mold 108 (FIG. 2).

Figure 5:
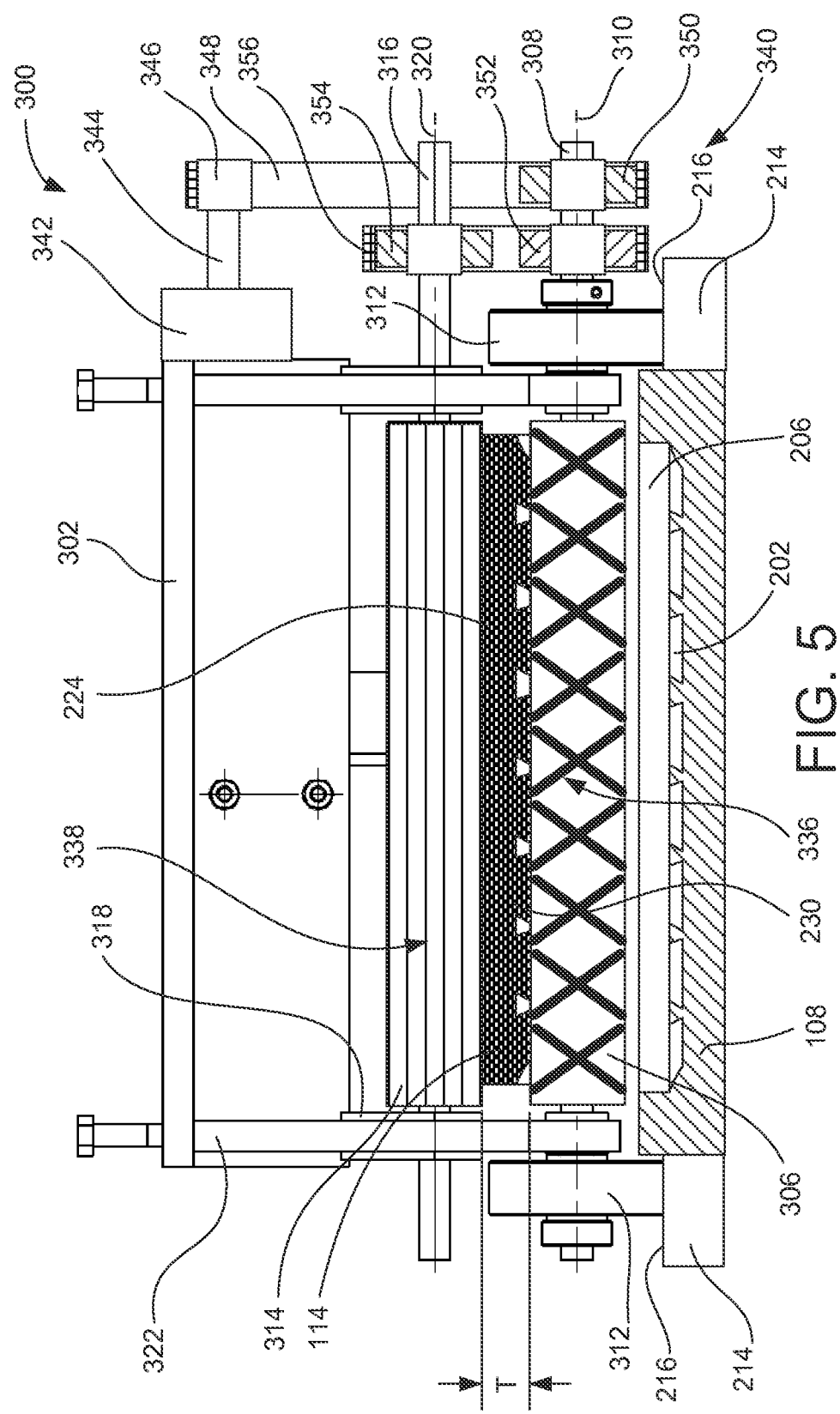
FIG. 5 is a cross section of a tread extractor during a tread extraction operation from a mold in accordance with a preferred embodiment.
Figure 6:
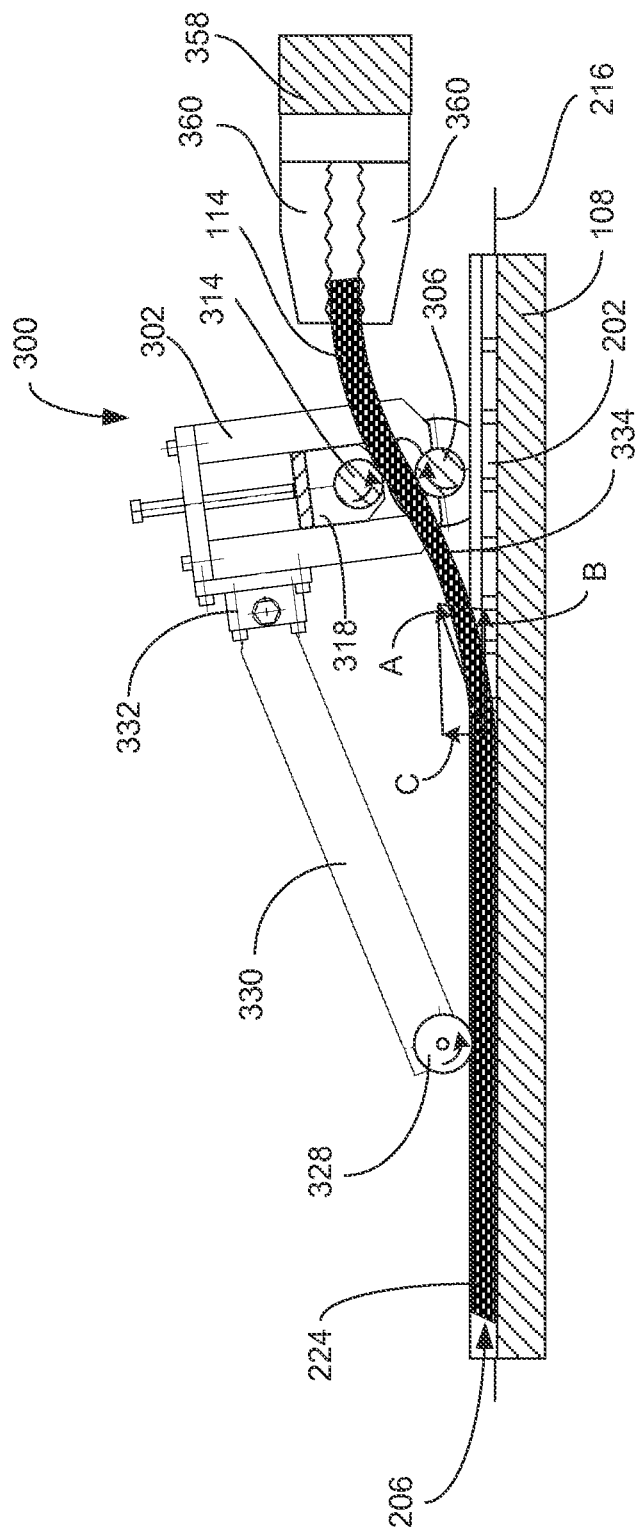
FIG. 6 is a side view of a tread extraction operation in accordance with a preferred embodiment.

FIG. 5 is a cross section from a front perspective and FIG. 6 is a cross section from a side perspective of the tread extractor 300 in use during removal of a tread 114 from the mold 108. As shown in FIG. 5, the wheels 312 of the extractor 300 ride on the tracks 216 of the mold 108 when the extractor 300 is operating to remove the tread 114 from the mold cavity 206. When flash 227 (see FIG. 3) is present on the tread 114, the wheels 312 are advantageously placed in contact with the mold 108 beneath any flash that may be present. As best shown in FIG. 6, the third wheel 328 rides on the top or inner surface 224 of the tread 114 to provide stability to the extractor 300 as well as to define a predetermined orientation of the nip rollers 306 and 314 relative to the mold 108.

In the illustrated embodiment, the nip of the rollers 314 and 306 may be configured to apply a tensile force to the tread 114 in addition to the lifting force caused by the tread passing through the offset nip of the rollers 314 and 306. The combination of the forces may be illustrated as a combined force in a direction, A, as depicted in FIG. 6. The resulting combined force, A, may result in an axial force component being applied in a direction, B, along the mold cavity 206, and in a normal force component being applied in a direction, C, normal to the mold cavity 206. For illustration purposes, the normal force component may operate to lift the tread 114 away from the mold 108, while the axial force component may operate to locally stretch the tread, thus providing, at least partially, a local deformation along a segment 334 of the tread 114. It is also possible that there is a normal force component that operates to locally stretch the tread.

The segment 334 of the tread 114 includes a freed portion of the tire tread that has not yet reached the nip of the rollers 306 and 314, in contrast to the portion of the tread 114 that is still resident in the mold 108. This deformation of the segment 334 can further aid to release the tread 114 from the mold 108 as previously described. The selection of an appropriate angle of extraction (e.g., extraction angle between vectors A and B as depicted in FIG. 6) of the tread 114 from the mold cavity 206, which can affect the relative magnitude between the axial and normal force components, can depend on various factors such as the thickness of the tread 114, the height of the lugs 230 (FIG. 3), the location, orientation and size of the negative draft angle portions of the tread pattern, if any, the composition and makeup of the tread 114 and other factors. The extraction angle may be affected by a number of operational parameters including the orientation of the rollers to the tread where there is provided an inclination which may be considered as a line connecting the two center-points of a given cross section of the nip rollers, which inclination is configured to lean either in the leading or following direction from vertical relative to the direction of motion of the extractor along the tread strip. When releasing the tread strip, in one embodiment, the tread 114 is manually released from one end of the mold 108 and fed in between the nip rollers 306 and 314 where the nip rollers are thereafter brought into engagement with the tread 114 establishing the forces explained herein. The feeding of the tread between the rollers may be accomplished manually. Depending on the inclination of the rollers, the tread strip may wrap along a circular segment of a cross section of the first roller 306 in a clockwise or counterclockwise manner, which may increase a desired frictional retention force between the rollers and the tread strip. The extraction angle A relative to the mold and angle B, may range from acute (e.g., as shown in FIG. 6) to obtuse (e.g., where roller 306 leads the extraction point), including a perpendicular extraction angle.

Returning now to FIG. 5, the fraction between the nip rollers 306 and 314 can be adjusted to suit the particular parameters of each application. As can be appreciated, the magnitude of the force from the rollers that stretches the tread 114 as previously described can be increased with improved traction between the tread and the rollers. Various roller configurations can be used for this purpose such as splined rollers, which can include various projections on one roller that cooperate with slots in the other roller, or knurled rollers, which can include any type of small ridges or grooves on the surface of one or both rollers arranged randomly or according to a pattern. In the illustrated embodiment, the bottom nip roller 306 is knurled having ridges 336 arranged in a diamond pattern. The ridges 336 can provide an improved grip on the lugs 230 of the tread pattern on the tread 114 as compared to the grip provided by smooth rollers. The top nip roller 314, which contacts the top or inner surface 224 of the tread 114, is also knurled having ridges 338 that extend parallel to one another and to the second centerline 320.

The embodiment for the extractor 300 illustrated in FIG. 5 further includes a drive system 340 that powers the rotation of the nip rollers 306 and 314. Although the drive system 340 is capable of driving both rollers 306 and 314 with a single motor 342, more than one motor may be used to individually power each roller. When the rollers 306 and 314 are powered, they operate to move or pull the extractor along the mold 108 while the tread 114 is removed. The points of rolling contact between the extractor 300 and the mold 108 (the wheels 312 and 328), are free spinning in the illustrated embodiment but may be configured for powered motion in alternative embodiments. As an alternative, the removal of the tread may proceed by moving the nip rollers along the mold in the longitudinal direction while maintaining the rollers in a fixed relation to mold. In such circumstances, the offset of the nip rollers will impart a lifting force to the tread as the nip rollers pass along the length of the tread.

In the illustrated drive system 340, the drive motor 342 has an output shaft 344 connected to a drive pulley 346. The drive pulley 346 engages a drive belt 348 that transfers the rotation of the drive pulley 346 to a first axle driven pulley 350. The first axle driven pulley 350 is connected to the first axle 308 such that rotation of the output shaft 344 is transferred to the first nip roller 306. In an embodiment where both rollers are driven, the first axle 308 may include a second roller driver pulley 352 that is rotatably connected to an second axle driven pulley 354 by a transfer belt 356. In this way, rotation of the output shaft 344 is optionally transferred to both the second and first axles 308 and 316 such that the second and first nip rollers 306 and 314 can rotate at substantially the same angular speed. Of course, although a belt-driven system is shown and described herein, the transfer of motion or powering of the nip rollers or engagement mechanism associated with the mold (e.g., wheels 312, etc.) can be accomplished by any other known motion transfer means such as chains, gears, a gearbox, individual motors to drive each roller, and other known devices.

As described thus far, the powered rotation of the nip rollers 306 and 314 of the extractor 300 can pull the extractor 300 along a tread 114 while the tread is freed from a mold. Driving the rotation of at least one of the nip rollers accomplishes the freeing of the tread from the mold while advancing the frame and nip rollers along the longitudinal length of the mold. In one embodiment, a freeing process of the tread 114 from the mold 108 can begin by placement of the extractor 300 adjacent one end of the mold 108. One end of the tread 114 can be freed from the mold 108 either manually or by use of a tool inserted between the mold 108 and the tread 114. The free end of the tire tread 114 can then be fed into the nip of the rollers 306 and 314 and thus engaged with the extractor. Thereafter, the extractor 300 may begin the powered rotation of the nip rollers 306 and 314 that will cause the extractor 300 to be pulled along the mold 108. As the extractor 300 travels along the length of the mold 108, it will leave behind a freed section of tread 114, which may simply lie over the mold cavity 206. When removing the freed tread 114 from the mold 108, an arm 358 (also shown in FIG. 1) may be used to grab the freed tread 114 that sits on top of the mold 108 and remove it.

As shown, the arm 358 includes clamping elements 360 configured to selectively engage one end of the tread 114. After the tread 114 has been released from the mold 108, the arm 358 with the end of the tread 114 clamped between the elements 360 may move in one direction or the other relative to the mold 108 to remove the released tread 114. In one embodiment as shown, for example, in FIG. 1, the arm 358 may move in an opposite direction than the direction of travel of the extractor 300 during an extraction process after the entire tread 114 has been freed from the mold 108. In alternative embodiments, the arm 358 may follow the extractor 300 and may even be connected to the extractor 300, as will be hereinafter described.

Figure 7:
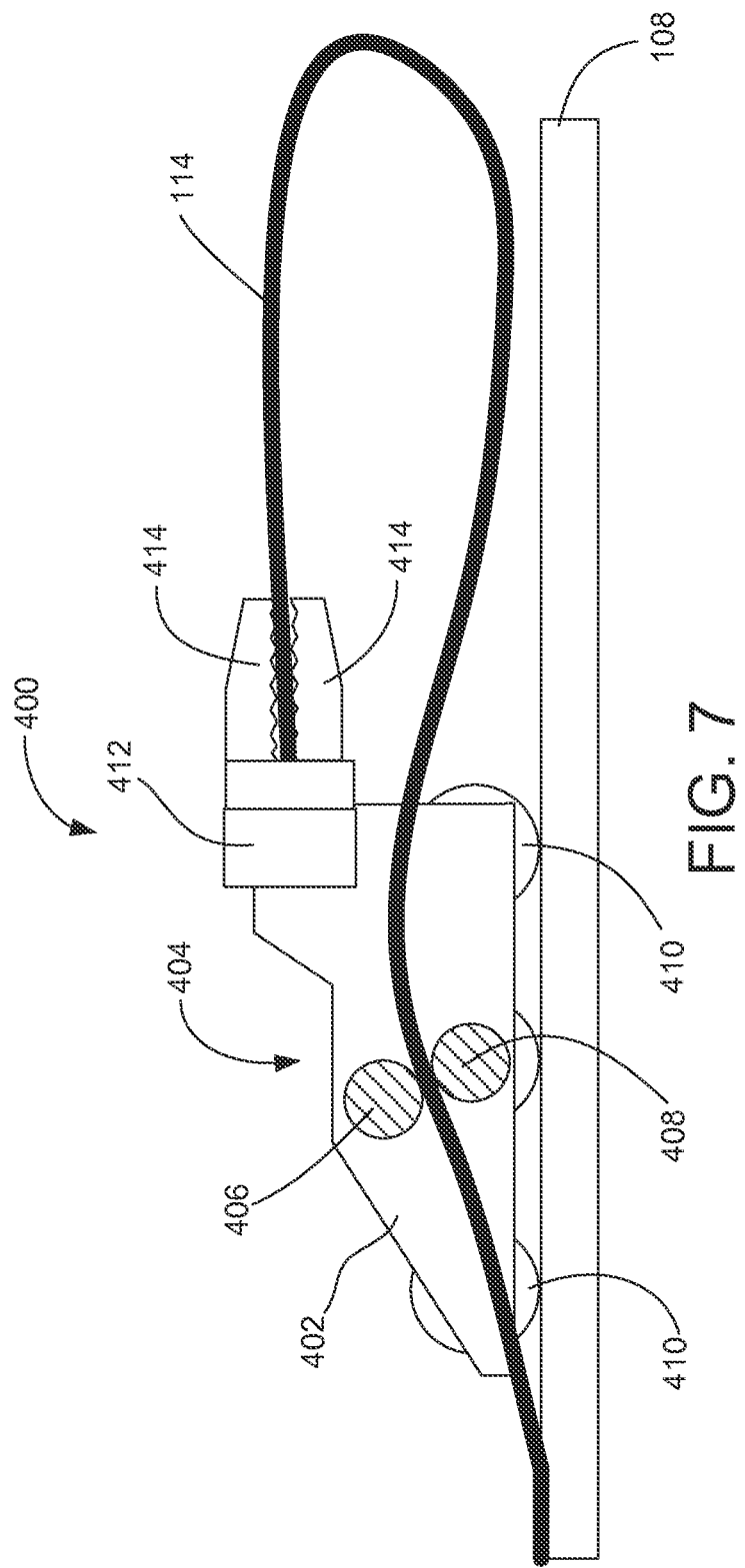
FIG. 7 is an alternative embodiment of a tread extractor in accordance with a preferred embodiment.

FIG. 7 is a side view in partial cross section of an alternative embodiment for an extractor 400 in accordance with the disclosure. The extractor 400 includes a body 402 that includes a set of nip rollers 404 having a second roller 406 and a first roller 408. The extractor 400 further includes a set of wheels 410 (three shown) that ride along ridges formed on the side of the first mold 108 as previously discussed. A grapple arm 412 is connected or otherwise associated with the body 402 and includes two fingers 414 configured to engage and retain the end of the tread 114 that is freed first from the mold 108. In this embodiment, as the extractor 400 frees the tread 114 from the mold 108, the grapple arm 412 retains the end of the tread 114 and pulls it along the mold 108 as the extractor moves, as shown in FIG. 7, in a direction from right to left. In this way, the freeing and removal of the tread 114 from the mold 108 can be accomplished in a single operation with a single pass of the extractor 400 over the mold 108.

As in the previous embodiment, the extractor 400 features structures configured to provide powered rotation to the nip rollers 404, which operate to stretch a segment of the tread 114 for easy removal from the mold 108. The distance between the rollers 404 as well as the angle of the application of the removal force applied to free the tread 114 from the mold 108 can be adjusted to suit the particular tread being freed. After the tread has been removed from the mold, the extractor 400 may be returned to a starting position on the side of the mold that it began its removal procedure, or may alternatively remain on side of the mold where the removal was completed and be reversed to remove the now freed tread strip from the mold 108. The reversal of the extractor in such a configuration may be accomplished by reversing the rotation of one or more prime movers operating to turn the rollers.

Figure 8:
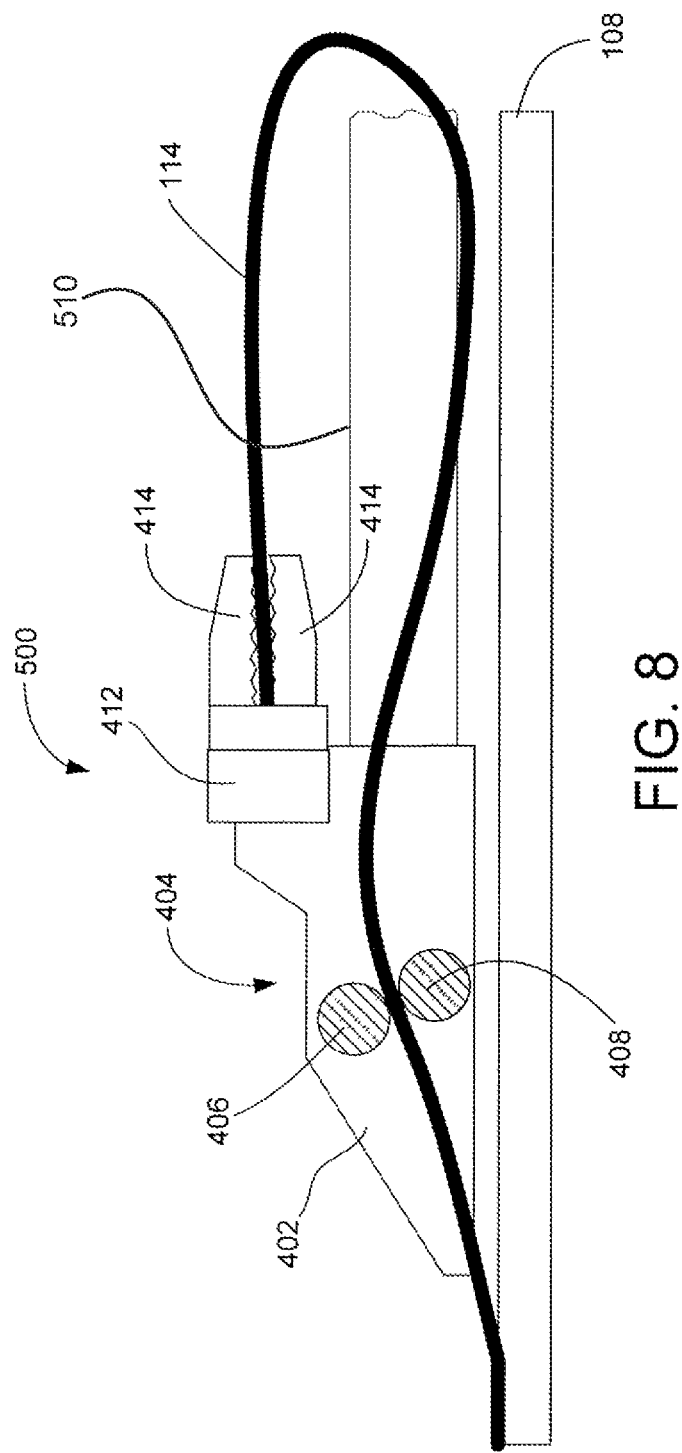
FIG. 8 is another alternative embodiment of a tread extractor in accordance with a preferred embodiment.

An additional alternative embodiment of an extractor 500 is shown in FIG. 8. As shown, the extractor 500 is substantially similar in operation to the extractor 400, but instead of having wheels 410 engaging the mold 108, the extractor 500 is connected to a robot arm 510. As previously described relative to FIG. 1, the robot arm 510 is configured to traverse the length of the mold 108 at a predetermined distance therefrom, such that removal of the strip of tread 114 is facilitated without direct contact between the extractor 500 and a metal surface of the mold 108. Other elements and features of the extractor 500 that are the same or similar to corresponding elements and features of the extractor 400 previously described are denoted by the same reference numerals as previously used for simplicity.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A method for manufacturing a tire tread, comprising:
   providing a frame capable of moving along a longitudinal length of a mold;
   providing a pair of rotatable nip rollers relative to the frame, the rotatable nip rollers including a first nip roller and a second nip roller;
   freeing an end of a tread from the mold and pinching such freed end of the tread between the nip rollers; and
   driving the rotation of at least one of the nip rollers such that the rotational motion of the first nip roller and the second nip roller where they engage the tire tread is in a rotational direction, and such that the tread is freed from the mold while advancing the frame and nip rollers along the longitudinal length of the mold,
   wherein the rotational direction of the first nip roller and the second nip roller between where they engage the tire tread is in a direction substantially opposite to a direction of advancing of the frame along the longitudinal length of the mold.

2. The method for manufacturing a tire tread of claim 1, further comprising engaging an end of the tread with a grapple arm so that, after the tire tread has been freed from the mold, the tread may be moved away from the mold.

3. The method for manufacturing a tire tread of claim 1, wherein the pair of rotatable nip rollers are disposed at an offset vertical distance relative to one another such that the tread may be lifted from the mold at an extraction angle relative to the mold.

4. The method for manufacturing a tire tread of claim 3, wherein the extraction angle is an acute angle.

5. The method for manufacturing a tire tread of claim 3, wherein the extraction angle is an obtuse angle.

6. The method for manufacturing a tire tread of claim 1, wherein the frame comprises a wheel and the mold includes a track extending along a portion of the longitudinal length of the mold, wherein the wheel engages the track while the frame moves along the longitudinal length of the mold.

7. The method for manufacturing a tire tread of claim 1, wherein the rotation of at least one of the nip rollers imparts an axial force to the tread to locally stretch the tread.

8. The method for manufacturing a tire tread of claim 1, wherein at least one of the pair of rotatable nip rollers is adjustable relative to the frame.

9. The method for manufacturing a tire tread of claim 1 further comprising:
   adjusting at least one of the nip rollers of the pair of rotatable nip rollers to engage the tread between the pair of rotatable nip rollers.

10. The method for manufacturing a tire tread of claim 1, wherein the frame comprises a wheel that rides on top of the tread.

11. The method for manufacturing a tire tread of claim 10, wherein the wheel is mounted to a leading bar pivotally connected to the frame.

12. The method for manufacturing a tire tread of claim 1, wherein a resilient element imparts a force to push the pair of rotatable nip rollers together.

13. The method for manufacturing a tire tread of claim 1, wherein driving the rotation of at least one of the nip rollers comprises driving the rotation of both of the nip rollers of the pair of rotatable nip rollers.

14. The method for manufacturing a tire tread of claim 13, the rotation of both of the nip rollers of the pair of rotatable nip rollers is driven by a single drive motor.

15. The method for manufacturing a tire tread of claim 1 further comprising:
   reversing rotation to the at least one of the pair of nip rollers after the tire tread has been removed from the mold.

16. The method for manufacturing a tire tread of claim 1, wherein at least one of the pair of rotatable nip rollers is knurled.

17. The method for manufacturing a tire tread of claim 1, wherein at least one of the pair of rotatable nip rollers comprises one or more projections.

18. The method for manufacturing a tire tread of claim 1 further comprising:
   engaging the end of the tread with a grapple arm.

19. The method for manufacturing a tire tread of claim 18, wherein the grapple arm is attached to the frame.

20. The method for manufacturing a tire tread of claim 1, wherein the frame is attached to a robot arm.

21. The method for manufacturing a tire tread of claim 1, wherein the robot arm is configured to traverse the longitudinal length of the mold at a predetermined distance therefrom.

* * * * *